June 20, 1950 — W. O. ROEDER — 2,512,174
SPORTSMAN'S POCKET-SIZE COLLAPSIBLE TREE SEAT
Filed April 8, 1949 — 2 Sheets-Sheet 1
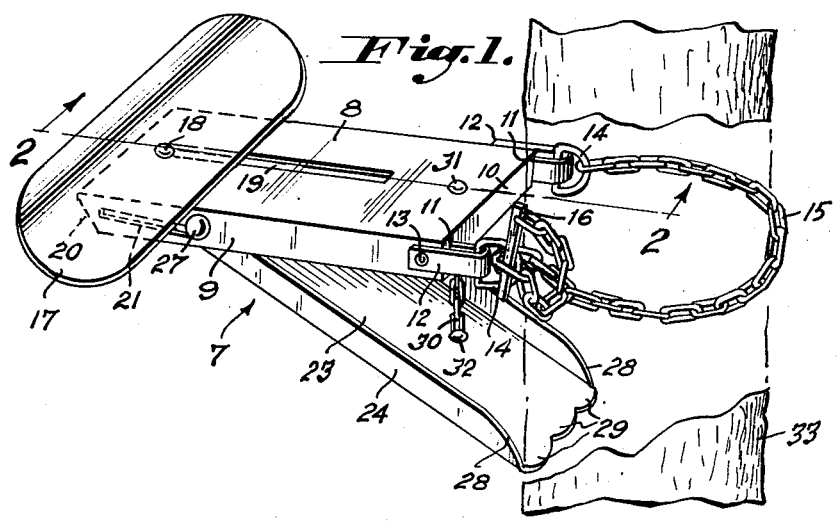
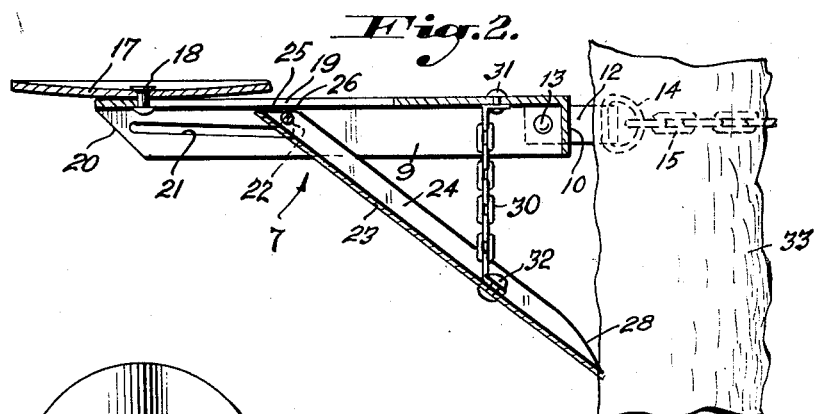
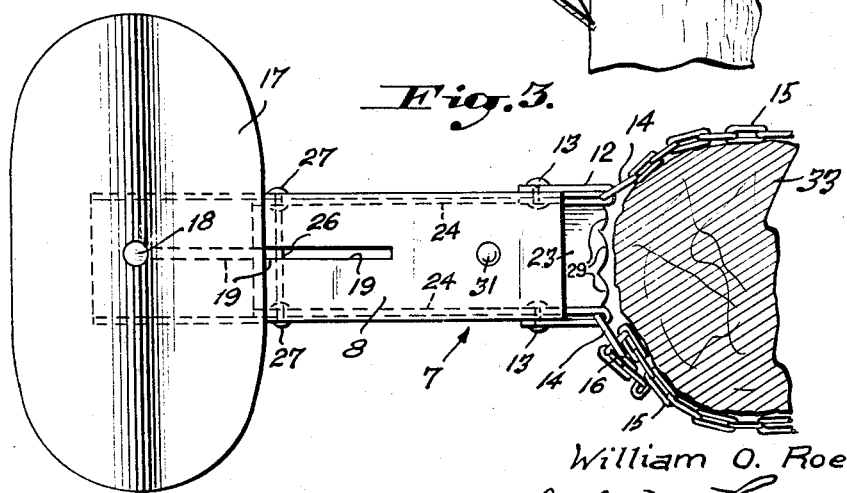
Inventor
William O. Roeder
By John N. Randolph
Attorney June 20, 1950   W. O. ROEDER   2,512,174
SPORTSMAN'S POCKET-SIZE COLLAPSIBLE TREE SEAT
Filed April 8, 1949   2 Sheets-Sheet 2

Inventor
William O. Roeder
By John N. Randolph
Attorney

Patented June 20, 1950

2,512,174

UNITED STATES PATENT OFFICE 2,512,174

SPORTSMAN'S POCKET-SIZE COLLAPSIBLE TREE SEAT

William O. Roeder, Oshkosh, Wis.

Application April 8, 1949, Serial No. 86,367

6 Claims. (Cl. 155—1)

This invention relates to a novel tree seat of extremely simple and compact construction which is capable of being readily collapsed into a size which can be conveniently carried in the pocket when not in use yet which can be readily extended and quickly and easily applied to the trunk of a tree or stump to afford a convenient and comfortable seat for hunters and hikers and which may be utilized on deer trails or runways while hunting foxes or rabbits to enable the hunter to sit comfortably and in a desired location.

Another object of the invention is to provide a collapsible tree seat which will eliminate the necessity of a hunter or hiker sitting on wet ground or in the snow or on a wet or snow covered stump or log and which will make it possible for the hunter to locate his seat in an advantageous position and where good observation is afforded.

Another object of the invention is to provide a collapsible seat which may be quickly mounted at any desired level above the ground and which is so constructed that when in an applied position, the tree stump or trunk, disposed above the level of the seat will form a back rest for the user.

A further object of the invention is to provide a quickly demountable tree seat which is light in weight and compact so that it can be conveniently carried in the pocket, which is capable of being economically manufactured and sold and yet which is extremely durable and efficient for accomplishing its intended purpose and quite capable of supporting the weight of substantially any adult.

Various other objects and advantages of the invention will hereinafter become more fully apparent from the following description of the drawings, illustrating presently preferred embodiments thereof, and wherein:

Figure 1 is a perspective view showing one form of the invention as it will appear in an extended, applied position;

Figure 2 is a substantially central longitudinal sectional view thereof taken substantially along a plane as indicated by the line 2—2 of Figure 1;

Figure 3 is a fragmentary top plan view showing the tree seat in an applied position;

Figure 4:
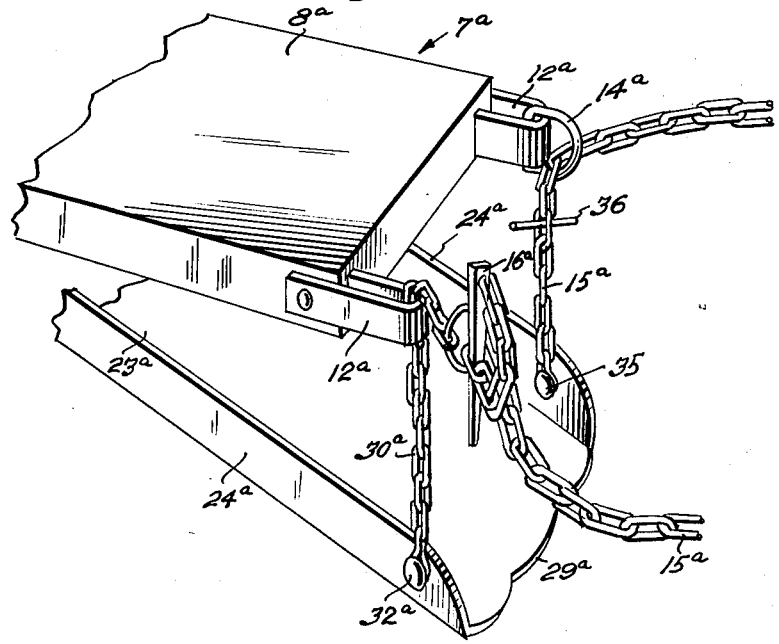
Figure 4 is an enlarged fragmentary perspective view of another, slightly modified form of the invention.

Referring more specifically to the drawings and first with reference to the form of the invention as illustrated in Figures 1, 2, 3 and 5, the present invention relates to a novel tree seat, designated generally 7, primarily intended and adapted for use by sportsmen such as hunters and hikers and which includes a relatively wide, elongated supporting bar 8 having complementary down turned side flanges 9 and an end flange 10. The supporting bar 8 is formed of a sufficiently heavy gauge metal capable of sustaining the weight of substantially any adult. The end wall 10, adjacent the sides 9, is provided with downwardly opening notches 11 for receiving complementary legs of corresponding substantially U-shaped metal straps 12, the legs of which straddle the side flanges 9 and are fixedly connected thereto by rivets or similar fastenings 13 for mounting one of said U-shaped straps 12 on each flange 9 and with the intermediate portions of the straps 12 projecting outwardly from the end flange 10. A ring 14 is loosely mounted on the intermediate portion of each strap 12, said rings preferably being D-shaped. A chain 15 has an end link thereof fastened to one of the D-rings 14 and has a tapered pin or spike 16 pivotally connected to the other end link thereof and which pin or spike 16 and the last mentioned end portion of the chain are capable of being passed freely through or detached from the other ring 14.

An elongated substantially rigid metallic plate 17 is connected by a rivet or similar fastening 18 to the supporting bar 8 and remote to its end flange 10. The rivet 18 rotatably and slidably engages a longitudinally elongated opening or slot 19 which is formed in the bar 8 intermediate of its side flanges 9 and which extends from near the end of said bar 8, located remote to the flange 10 inwardly of the bar 8 a distance of about one-half of its length. The plate 17 which forms the seat proper is bowed longitudinally and transversely so that its upper side is concave or dished.

The side flanges 9 are bevelled as seen at 20 at the ends thereof remote to the flange 10 and are provided with complementary longitudinally extending slots or openings 21 which extend inwardly from adjacent the bevelled ends 20 to points near the inner end of the slot 19 and which have upwardly extending portions 22 at their inner ends. The slots 21 are preferably inclined downwardly and inwardly. A brace 23 comprising a rigid elongated metal bar or plate is provided with upturned side flanges 24 and is of a width to fit between the side flanges 9 of the supporting bar 8. The side flanges 24 are preferably bevelled as seen at 25 at their outer ends and a pin 26 extends through the flanges 24 adjacent their bevelled ends and loosely through the openings or slots 21 for positioning the ends of the flanges 24, located adjacent the pin 26, between the flanges 9. The pin 26 is provided with headed ends 27 which slidably engage the outer sides of the flanges 9, and as seen in Figures 1 and 2, the brace 23 is supported on the flanges 9 by said pin 26 with its flanges 24 extending upwardly. The flanges 24 are provided with rounded opposite ends 28 and the opposite, free end of the bar 23, located adjacent the flange ends 28 is notched to form teeth or serrations 29 which are bevelled on their upper sides and thereby sharpened. A short length of chain 30 is connected at one of its ends by a rivet or similar fastening 31 to the underside of the supporting bar 8, near the end flange 10 and intermediate of the side flanges 9 and the depending, opposite end of the chain 30 is connected by a similar rivet or fastening 32 to the brace bar 23 near but spaced from its serrated free end 29.

Figure 5:
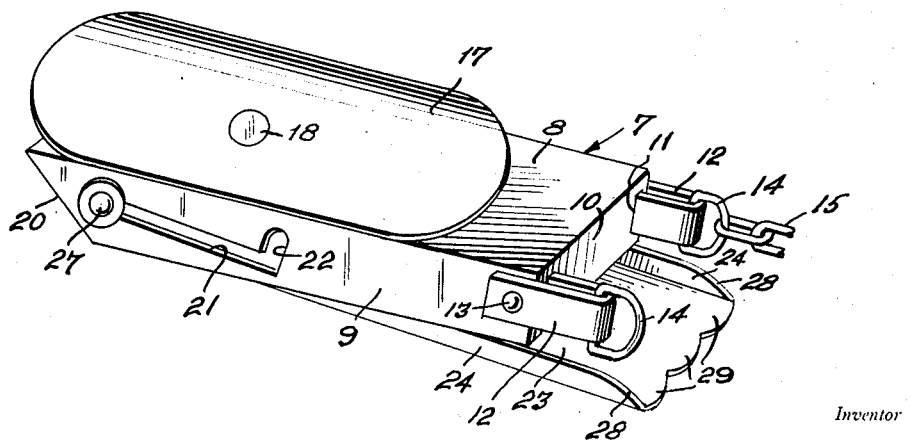
Figure 5 is an enlarged perspective view showing the tree seat of Figures 1 to 3 in a folded or retracted position and as it will appear when stored or carried in the pocket.

It will be readily apparent that the pin 26 can be moved to the outer ends of the slots 21 so that the brace 23 can be folded to a position beneath the supporting bar 8 and substantially or nearly parallel thereto, as seen in Figure 5, and the seat plate 17 can be rotated to a position with its longitudinal axis parallel to the longitudinal axis of the supporting bar 8 and the rivet 18 moved to the inner end of the slot 19 for positioning the plate 17 over the supporting bar 8. In this collapsed or folded position of the tree seat 7, as illustrated in Figure 5, a very small and compact structure exists which can be conveniently carried in the pocket.

To extend and apply the seat 7, the seat plate 17 is turned and slid relatively to the supporting bar 8 back to its position of Figures 1 to 3 and the brace 23 is allowed to swing downwardly on the pin 26 and said pin is moved to the inner ends of the slots 21 and engages in the upwardly extending portions 22 thereof for locking the brace 23 in its extended position of Figures 1 to 3 and in which position the brace is supported at substantially an oblique angle to the plane of the supporting bar 8 by the chain or flexible member 30. With the tree seat 7 thus extended, the chain 15 is passed around the trunk of a tree and through the ring 14, to which it is not permanently fastened. After the chain 15 has been drawn up tight around the tree trunk 33, as illustrated in Figures 1, 2 and 3, the pin or spike 16 is passed downwardly through a link of the chain which has just passed through said last mentioned ring 14 and so that the pin or spike 16 will be disposed crosswise to said ring 14 and will bear thereagainst to prevent the chain from being withdrawn from the last mentioned ring 14 until the spike or pin 16 is again removed. It will thus be seen that the seat structure 7 can be quickly and easily fastened detachably around a tree trunk or stump 33 at any desired level and for positioning the flange 10 against or substantially against the tree trunk and with the supporting bar 8 and plate 17 disposed substantially in a horizontal plane and projecting substantially perpendicularly from the tree trunk. With these parts thus disposed, the brace 23 will extend downwardly and inwardly toward the tree trunk 33 from the supporting bar 8 at a point outwardly of its intermediate portion, and the serrations or teeth 29 will bear against the tree trunk, below the chain 15 and will be embedded or anchored therein when weight is placed upon the seat 17 or supporting bar 8. With the seat structure thus assembled and applied, as illustrated in Figures 1, 2 and 3, said structure will effectively function to provide a sturdy and substantial seat for a heavy adult who may sit upon the seat plate 17 and rest his back against the tree trunk 33. By removing the pin or spike 16 the chain 15 may be readily disengaged from the tree trunk 33 and the seat structure 7 quickly and easily returned to a collapsed or folded position as seen in Figure 5.

Figure 4 illustrates a slightly modified form of the invention, certain of the parts of which being identical with the form of Figures 1 to 3 and 5 have not been illustrated. The modified seat structure of Figure 4, designated generally 7a includes a supporting bar 8a which is identical with the supporting bar 8 and which has strap members 12a corresponding to and mounted in the same manner as the straps 12. Only one of the strap members 12a is provided with a ring 14a. In lieu of the chain 30, a short chain 30a is anchored at one end by a rivet or fastening 32a to a side flange 24a located adjacent the free, serrated end 29a of the brace 23a and beneath and adjacent the other strap member 12a. Said chain 30a extends upwardly directly through the last mentioned strap member 12a and is slidable therein and has a ring 34 connected to its upper end link and above said last mentioned strap member 12a. The chain 15a is anchored at one end by a rivet or fastening 35 to the other brace flange 24a and likewise adjacent the serrated brace end 29a and said chain 15a extends upwardly therefrom and through the ring 14a which is disposed thereabove and is adapted to then be passed around a tree trunk or stump and to have its free end loosely passed through the ring 34 and adjustably anchored to prevent said last mentioned end of the chain 15a from sliding outwardly from the ring 34 by a pin or spike 16a, in the same manner as previously described with reference to the spike 16. One link of the chain 15a near its first mentioned end is provided with a cross bar or stop 36 for engagement with the ring 14a to limit the extent that the chain 15a can be drawn outwardly therethrough. It will be readily apparent that by this connection the ends of the chains 15a and 30a which are attached to the brace flanges 24a will support the brace 23a in a downwardly and inwardly extending position with respect to the supporting bar 8a and when a downward pressure is exerted on the outer end of the supporting bar 8a the chains will thereby have a tendency to tighten to prevent the supporting bar 8a from sagging. The arrangement of Figure 4 also enables the brace 23a to be disposed at different angles with respect to the supporting bar 8a when the tree seat 7a is in an applied position.

Various other modifications and changes are likewise contemplated and may obviously be resorted to, without departing from the spirit or scope of the invention as hereinafter defined by the appended claims.

I claim as my invention:

1. A readily demountable and collapsible tree seat support comprising an elongated supporting bar, a seat member rotatably and slidably supported on the supporting bar and movable between an extended position adjacent an outer end of the supporting bar and transversely thereof to a retracted position longitudinally of the supporting bar and substantially directly thereover, a brace swingably and slidably connected to the supporting bar and movable from a collapsed position beneath and substantially parallel to the supporting bar to an extended position, said brace extending downwardly at an oblique angle from the supporting bar and from a point intermediate of its ends when in an extended position and having a free end adapted to bear against a tree trunk, and a flexible member having one end anchored to the opposite, inner end of the supporting bar, adjacent to one side edge thereof and detachably and adjustably connected to the supporting bar adjacent its inner end and other side edge, said flexible member being adapted to detachably engage around a tree trunk for supporting the inner end of the supporting bar thereagainst or adjacent thereto and so that the supporting bar will project substantially horizontally therefrom.

2. A tree seat as in claim 1, said flexible member comprising a chain, said supporting bar having rings connected to and projecting from its last mentioned, inner end, said chain being connected at one end to one of said rings and extending loosely through the other ring, and a spike connected to the free end of said chain for selectively engaging the links thereof and for bearing against the last mentioned ring to provide a stop for the chain.

3. A tree seat as in claim 1, said supporting bar having depending side flanges, said brace having upwardly extending side flanges disposed between the side flanges of the supporting bar, a pin extending through said side flanges of the supporting bar and brace for connecting the brace to the supporting bar, the side flanges of said supporting bar having longitudinally extending complementary openings for slidably receiving said pin for pivotally and slidably connecting the brace to the supporting bar and including upturned inner end portions for locking the brace in an extended position relatively to the supporting bar.

4. A collapsible support or tree seat comprising an elongated supporting bar, flexible means adjustably connected to one end of said supporting bar and adapted to detachably engage around a tree trunk or post for detachably anchoring the supporting bar thereto and for positioning the supporting bar in outwardly projecting relationship therefrom, a plate forming the seat turnably and slidably connected to the supporting bar adjacent its opposite, outer end for disposition thereon transversely or longitudinally of the supporting bar, a brace pivotally connected to the supporting bar and extending downwardly and inwardly therefrom and from a point intermediate of the ends thereof and adapted to bear with its free end against the tree trunk, and means for slidably connecting the brace to the supporting bar for positioning the brace beneath and substantially parallel thereto.

5. A tree seat as in claim 4, and a flexible member for connecting the supporting bar adjacent its inner end to the brace near the free end of the latter.

6. A tree seat as in claim 4, said flexible means including a chain connected at one end to the brace, adjacent the free end of the latter, and having an intermediate portion slidably connected to a portion of the inner end of the supporting bar, and a second chain anchored at one end near the free end of said brace and having an intermediate portion slidably connected to a portion of the inner end of the supporting bar and a free end portion adapted to extend detachably around the tree trunk and detachably and adjustably connected to the free end of the first mentioned chain.

WILLIAM O. ROEDER.

REFERENCES CITED

The following references are of record in the file of this patent:

UNITED STATES PATENTS

| Number | Name | Date |
|---|---|---|
| 2,394,203 | Pruder | Feb. 5, 1946 |

FOREIGN PATENTS

| Number | Country | Date |
|---|---|---|
| 11,416 | Austria | Apr. 10, 1903 |
| 67,545 | Germany | Mar. 8, 1893 |